United States Patent [19]
Thomas

[11] Patent Number: 5,537,885
[45] Date of Patent: Jul. 23, 1996

[54] ELECTRONICALLY CONTROLLED GEAR SHIFT MECHANISM PARTICULARLY SUITED FOR RACING CARS

[76] Inventor: Gerald A. Thomas, 106 Conrad Rd., Alburtis, Pa. 18011

[21] Appl. No.: 285,790

[22] Filed: Aug. 4, 1994

[51] Int. Cl.$^6$ .................................................. F16H 59/04
[52] U.S. Cl. ........................ 74/335; 74/336 R; 74/473 R; 74/625; 180/336; 340/456; 340/461
[58] Field of Search ................................ 74/335, 336 R, 74/473 P, 473 R, DIG. 7, 625; 180/332, 336; 340/456, 461

[56] References Cited

U.S. PATENT DOCUMENTS

| | | | |
|---|---|---|---|
| 2,751,580 | 6/1956 | Stump | 340/456 |
| 4,631,515 | 12/1986 | Blee et al. | 340/441 X |
| 4,873,891 | 10/1989 | Guanciale | 74/336 R X |
| 5,309,139 | 5/1994 | Austin | 340/441 X |
| 5,371,487 | 12/1994 | Hoffman et al. | 340/461 X |
| 5,448,925 | 9/1995 | McFadden | 74/336 R X |
| 5,471,894 | 12/1995 | McFadden | 74/336 R |

FOREIGN PATENT DOCUMENTS

| | | | |
|---|---|---|---|
| 3339591 | 5/1985 | Germany | 74/473 R |
| 4145264 | 5/1992 | Japan | 74/335 |
| 1105359 | 7/1984 | U.S.S.R. | 180/336 |

Primary Examiner—Rodney H. Bonck
Assistant Examiner—Nathan O. Jensen
Attorney, Agent, or Firm—Sanford J. Piltch

[57] ABSTRACT

A gear shift mechanism particularly suited for a drag racing car is disclosed that causes the gear shifts of a transmission to be sequenced upon the attainment of selectable predetermined conditions so that the drag racing car obtains its desired acceleration in an optimum manner. The gear shift mechanism comprises electrically or pneumatically operated cylinders that move the gear shift lever upon sensing optimum conditions related to the acceleration performance of the drag racing car. The cylinders are positioned on opposite sides of the gear shift lever and provide counter-forces during shifting through at least one gear and yet allow the gear shifting to preferably be accomplished in a single direction. The counter-acting cylinders eliminate overshooting of the gear shift lever during movement of the lever arm. Alternatively, manual input instead of predetermined conditions may be substituted into the gear shift mechanism.

9 Claims, 5 Drawing Sheets 5,537,885

ELECTRONICALLY CONTROLLED GEAR SHIFT MECHANISM PARTICULARLY SUITED FOR RACING CARS

FIELD OF THE INVENTION

The present invention relates to a shift lever control mechanism for an automobile. More particularly, the present invention relates to a shift lever of a drag racing car that is responsive to two oppositely positioned piston devices that are, in turn, responsive to either an electronic or manual controller means. Specifically, the present invention relates to two oppositely positioned pistons that act directly on the shift lever so as to move the shift lever of the drag racing car from first, to second, to third gears in response to command signals from either various speed detection circuits or from an elapsed time measurement circuit or from manual initiation.

BACKGROUND OF THE INVENTION

The performance of a drag racer, as judged in a drag racing contest, is primarily determined by the ability of the racer to accelerate from a starting position. According to established rules, the sport of drag racing involves accelerating a car from a standing start to a finish line, usually over a distance of ⅛ or ¼ mile, in the shortest possible time. The driver normally must sequentially shift the drag racing car from lower to higher gears in the shortest possible time and yet perform such shifting when optimum conditions, inherent in drag racing cars, are present.

U.S. Pat. No. 4,873,891 [Guanciale], herein incorporated by reference, describes a drag racing car having an automatic transmission that is shifted in discrete increments to sequentially higher gears in response to the activation of a single solenoid that is, in turn, responsive to an electrical signal produced each time the engine of the drag racing car reaches a pre-determined revolutions per minute (RPM) level. Even though the shift lever is moved in discrete increments, the use of a single solenoid may disadvantageously have a tendency to cause the gear shift lever to overshoot. Further, the use of pre-determined engine RPM levels to determine the optimum time to perform the gear shifting may be somewhat restrictive because it does not take into account other factors, such as wheel speed or rotation of the drag racing car, or elapsed time from a starting condition or from a previous gear shift occurrence.

It is, therefore, a principal object of the present invention to provide a gear shift control mechanism that moves the shift lever in an instantaneous manner yet has means that safeguards against any overshoot of the movable shift lever.

It is another object of the present invention to provide for a gear shift control mechanism that has means for determining the optimum conditions for sequentially shifting gears and which conditions take into account various factors, such as wheel rotation, elapsed time, as well as pre-determined engine RPM levels.

Still further, it is an object of the present invention to provide gear shift control mechanisms that automatically move the shift lever in one direction in either a planar or a curvilinear manner.

Further still, it is an object of the present invention to provide a display that only indicates critical functions of the drag racing car so that the driver's attention is not unnecessarily diverted, thereby, allowing him/her to concentrate on the important aspects of the drag racing car's operation, especially during a drag racing contest.

Other objects and features of the present invention will become evident hereinafter.

SUMMARY OF THE INVENTION

The present invention is directed to a gear shift control mechanism that employs two oppositely positioned piston devices that act directly, in a counter-active manner, on a shift lever of the gear control mechanism and yet cause the shift lever to be moved in one direction and in discrete increments.

The drag racing car comprises a transmission and a gear shift control mechanism. The transmission has at least first, second and third speed changing gears and means for shifting the gears. The gear shift control mechanism comprises a shift lever and first and second motion control cylinders with the shift lever being interconnected to and controlling the means for shifting the speed changing gears.

The shift lever has upper and lower portions each having opposite sides with a projection extending outward from the lower portion. The first and second cylinders are respectively responsive to first and second electrical control signals and are disposed on opposite sides of the lower portion of the shift lever. The first and second cylinders each has a movable shaft that axially extends outward from its respective cylinder. The first and second cylinders are positioned in a predetermined manner so that the first and second cylinders supply, by means of their axially extending shaft, counter forces which move the shift lever in one direction and in a manner to sequence from at least one speed to another speed.

The drag racing car further comprises a controller that is responsive to appropriate command signals generated by means for detecting the rotational speed of the wheel of the drag racing car, means for detecting the RPM level of the engine of the drag racing car, or means responsive to a circuitry for measuring the elapsed time involved with the operation of the drag racing car during a drag racing contest. The controller may also be initiated through manual control by the operator of the dragster.

BRIEF DESCRIPTION OF THE PREFERRED EMBODIMENTS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
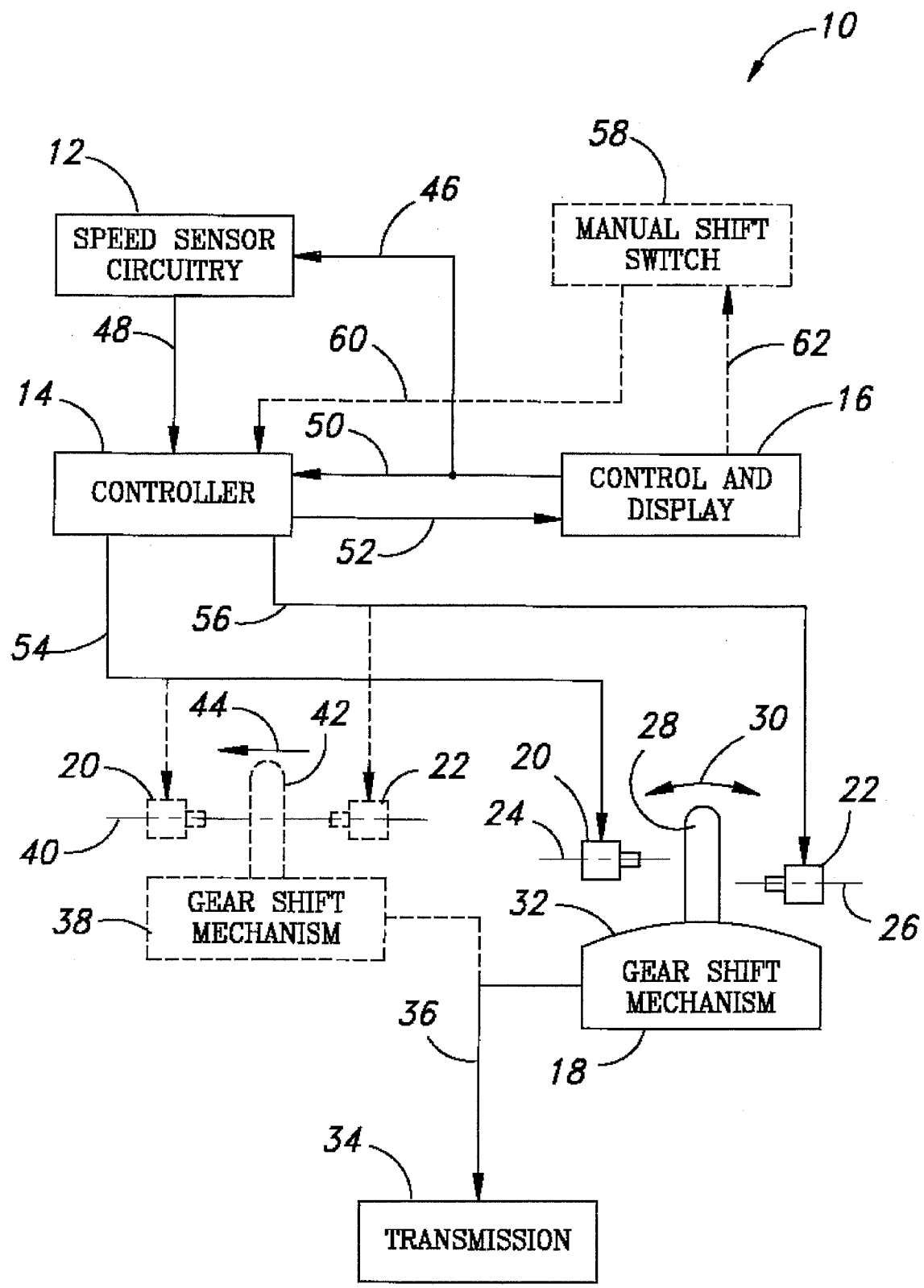
FIG. 1 is a block diagram of the major elements of the present invention.

Referring now to the drawings in detail, where like numerals refer to like parts or elements, there is shown in FIG. 1 a block diagram of the gear shifting system 10 that controls the shifting of an automatic transmission mounted in a drag racing car. The shifting is accomplished in a substantially instantaneous manner when selected and predetermined conditions, inherent in the operation of the drag racer, are met so that the performance of the drag racing car, in particular its acceleration, can be optimized. FIG. 1 comprises a plurality of elements some of which are given in Table 1.

TABLE 1

| Reference No. | Element |
| --- | --- |
| 12 | Speed Sensor Circuitry |
| 14 | Controller |
| 16 | Control and Display |
| 18 | Gear Shift Mechanism |
| 20 | Cylinder 1 |
| 22 | Cylinder 2 |
| 28 | Shift Lever |
| 34 | Transmission |
| 38 | Alternate Gear Shift Mechanism |
| 42 | Alternate Shift Lever |
| 58 | Manual Shift Signal |

Speed sensor circuitry 12, to be further discussed with reference to FIG. 4, comprises alternate means to detect RPM levels of the engine, the rotational speed of the wheels of the drag racing car, and the speed of other devices whose rotation is indicative of the acceleration performance of the drag racing car. Speed sensor circuitry 12, in response to an input signal on path 46 from control and display 16, provides one or more appropriate command signals on path 48 which are routed to controller 14.

Further, as will be described with reference to FIG. 4, controller 14 also receives a signal from the control and display 16 on path 50 and, in response thereto, provides, via signal path 52, one or more output display signals to the control and display 16. Further, the controller 14, in an alternate embodiment, via signal path 60, receives a signal from the manual shift switch 58 which generates such a signal in response to a signal generated by the control and display 16 and present on signal path 62. The controller 14, in response to either the speed sensor circuitry 12 or manual shift switch 58, provides a relatively high current output signal on either or both of signal paths 54 and 56 which are respectively routed to cylinders 20 and 22.

As shown in FIG. 1, cylinders 20 and 22 are arranged to operate with either gear shift mechanism 18, having shift lever 28, or with gear shift mechanism 38, having shift lever 42 (shown in phantom along with cylinders 20 and 22). The gear shift mechanism 18, or alternatively gear shift mechanism 38, is connected to transmission 34 by way of linkage 36. Transmission 34 is of a conventional type and is preferably an automatic shift type having at least first, second and third speed changing gears, but also preferably having neutral and reverse, and means for shifting all of the gears. As is known, the placement of speed changing gears into either reverse or neutral is almost always exclusively accomplished by a driver's manipulation of the related shift lever.

As further shown in FIG. 1, cylinders 20 and 22, associated with gear shift mechanism 38, are positioned on opposite sides of shift lever 42. The cylinders 20 and 22 are further disposed so as to be coaxial with the axis 40 which is parallel to the axis (not shown) of the gear shift mechanism 38 and provide counter-forces, by means of the axially extending rods (to be described), that cause the shift lever 42 to be moved in the direction indicated by arrow 44. The movement of the shift lever 42 in the direction 44 is accomplished in a planar manner rather than in a curvilinear manner as accomplished by gear shift mechanism 18.

As still further shown in FIG. 1, the cylinders 20 and 22 associated with gear shift mechanism 18 are disposed on opposite sides of shift lever 28, but each has an axis 24 and 26, respectively, that is offset and angled (to be further described with reference to FIG. 3) with respect to each other so that the shift lever 28 is moved in a curvilinear manner, as indicated by arrow 30, corresponding to the curvilinear upper surface 32 of the gear shift mechanism 18. As is known, a shift lever, such as shift lever 28, that is moved in a curvilinear manner, allows either by a visual observation or physical touch the driver to more quickly, relative to a shift lever moved in a linear manner, determine the position of the gear speed that the drag racing car is engaged. For example, if the shift lever is at its uppermost position, this is indicative that the shift lever is in its intermediate or 2nd gear position. The gear shift mechanism 18 may be further described with reference to FIG. 2.

Figure 2:
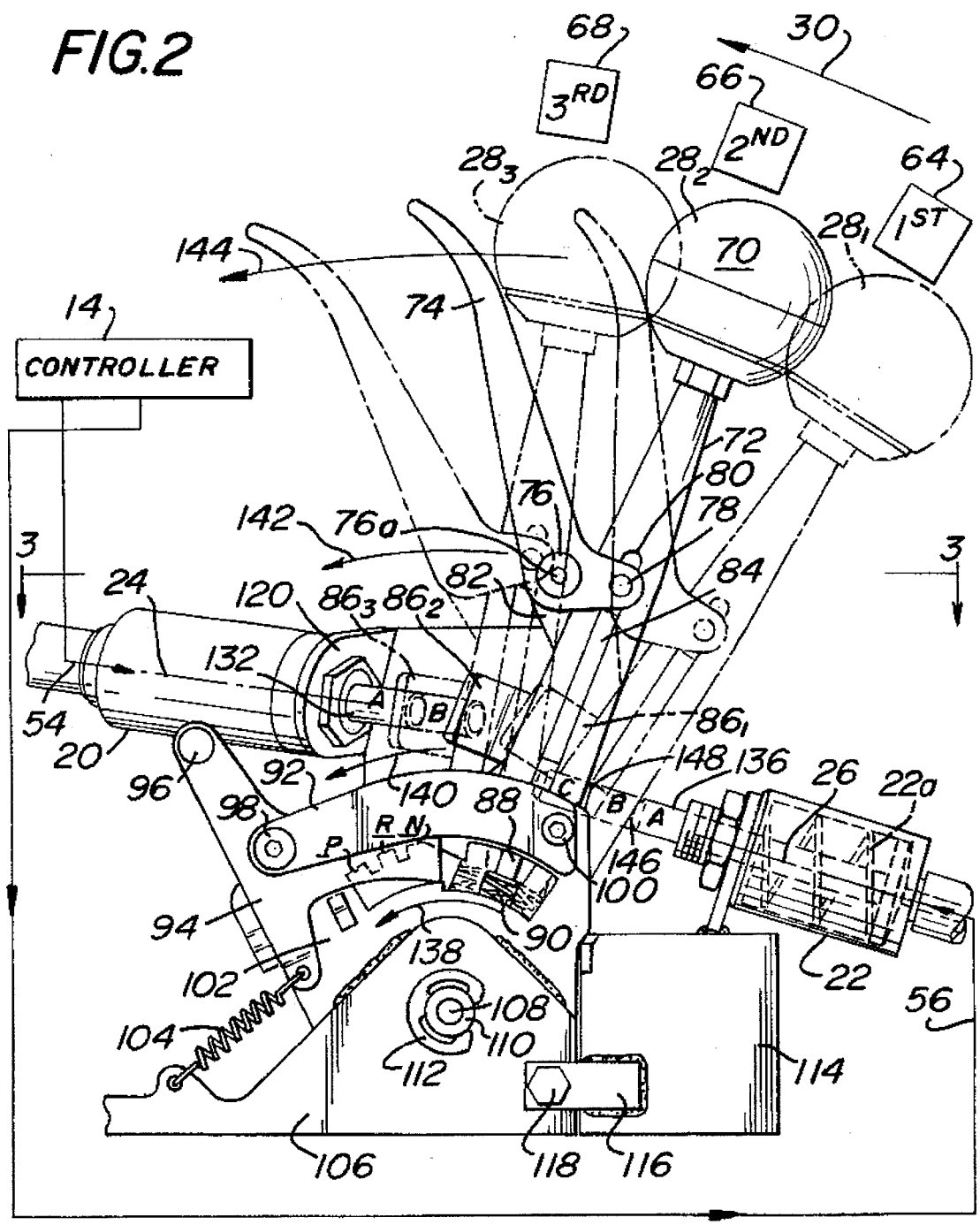
FIG. 2 is a partially broken away side elevational view illustrating the gear shift control mechanism of one embodiment of the present invention.

FIG. 2 illustrates the gear shift mechanism 18, in particular, the shift lever 28 which acts as a lever or control member to automatically sequence the gears of the transmission 34 from the 1st, 2nd and to 3rd, respectively, illustrated by boxes 64, 66 and 68. Although the "shift" is described as a forward shifting pattern, as is common in most commercially available vehicles for the general consumer, racing commonly utilizes a "reverse pattern" shifting mechanism. For ease of explanation for the general consumer the forward pattern will be described for the purposes of this discussion. The reader should note that "reverse pattern" shifting can be achieved by reversing the positioning of the piston cylinders 20, 22 with respect to the shift lever and changing the sequencing of the control so that the respective shafts co-act upon the shift lever in the appropriate sequence and timing to accomplish the reverse pattern shifting rather that the forward pattern shifting.

FIG. 2 illustrates various positions of shift lever 28, i.e. $28_1$ (shown in phantom), $28_2$ (shown in solid) and $28_3$ (shown in phantom) as being associated with the 1st, 2nd and 3rd gear (boxes 64, 66 and 68). The shift lever 28 comprises a plurality of elements indicated in Table 2 but only labeled for the shift lever position $28_2$ of FIG. 2 corresponding to the position of the 2nd gear.

TABLE 2

| Reference No. | Element |
| --- | --- |
| 70 | Knob |
| 72 | Shift Lever Arm |
| 74 | Reverse Lockout Lever |
| 76 | First Pivotal Member of Lever 74 |
| 76a | Pivot Pin of Member 74 |
| 78 | Second Pivotal Member of Lever 74 |

TABLE 2-continued

| Reference No. | Element |
| --- | --- |
| 80 | Channel |
| 82 | Interconnecting Member Lever 74 |
| 84 | Control Rod |
| 86 | Projection Extending from Rod 72 |
| 88 | Gear Positioning Pin |
| 90 | Spring Control Member |

From a review of FIG. 2, it should be noted that the projection 86 is indicated by elements $86_1$, $86_2$ and $86_3$, so as to show correlation to the positions of shift levers $28_1$, $28_2$ and $28_3$. Further, it should be noted, for the sake of clarity, that the elements 76 and 76a are only illustrated for the position of shift lever $28_2$.

The gear shift mechanism 18 of FIG. 2 is preferably a gate or detent type device consisting of a wheel having inclined teeth into which the control rod 88 and spring 90 cooperatively assist each other so as to be moved along therein and cause the movement of the shift lever 28, in the curvilinear direction 30, to incrementally and sequentially change the gears for the transmission 34 (see FIG. 1) from the low (1st), to medium (2nd) to the high (3rd) gears. The gear shift mechanism 18 further comprises a plurality of elements given in Table 3 and arranged as shown in FIG. 2.

TABLE 3

| Reference No. | Element |
| --- | --- |
| 92 | Curved Support Member |
| 94 | Reverse Lockout Plate |
| 96 | Reverse Lockout Knob |
| 98 | Fastening Member |
| 100 | Fastening Member |
| 102 | Shift Gate Plate |
| 104 | Reverse Lockout Spring Member |
| 106 | Curved and Peaked Shifter Base |
| 108 | Pivot Pin |
| 110 | Retention Cap for Pivot Pin |
| 112 | C-Shaped Fastener |
| 114 | Support Member for Cylinder 22 |
| 116 | Bracing Member Connecting Base 106 and Support 114 |
| 118 | Connecting Member |
| 120 | Support Member for Cylinder 20 |

Figure 3:
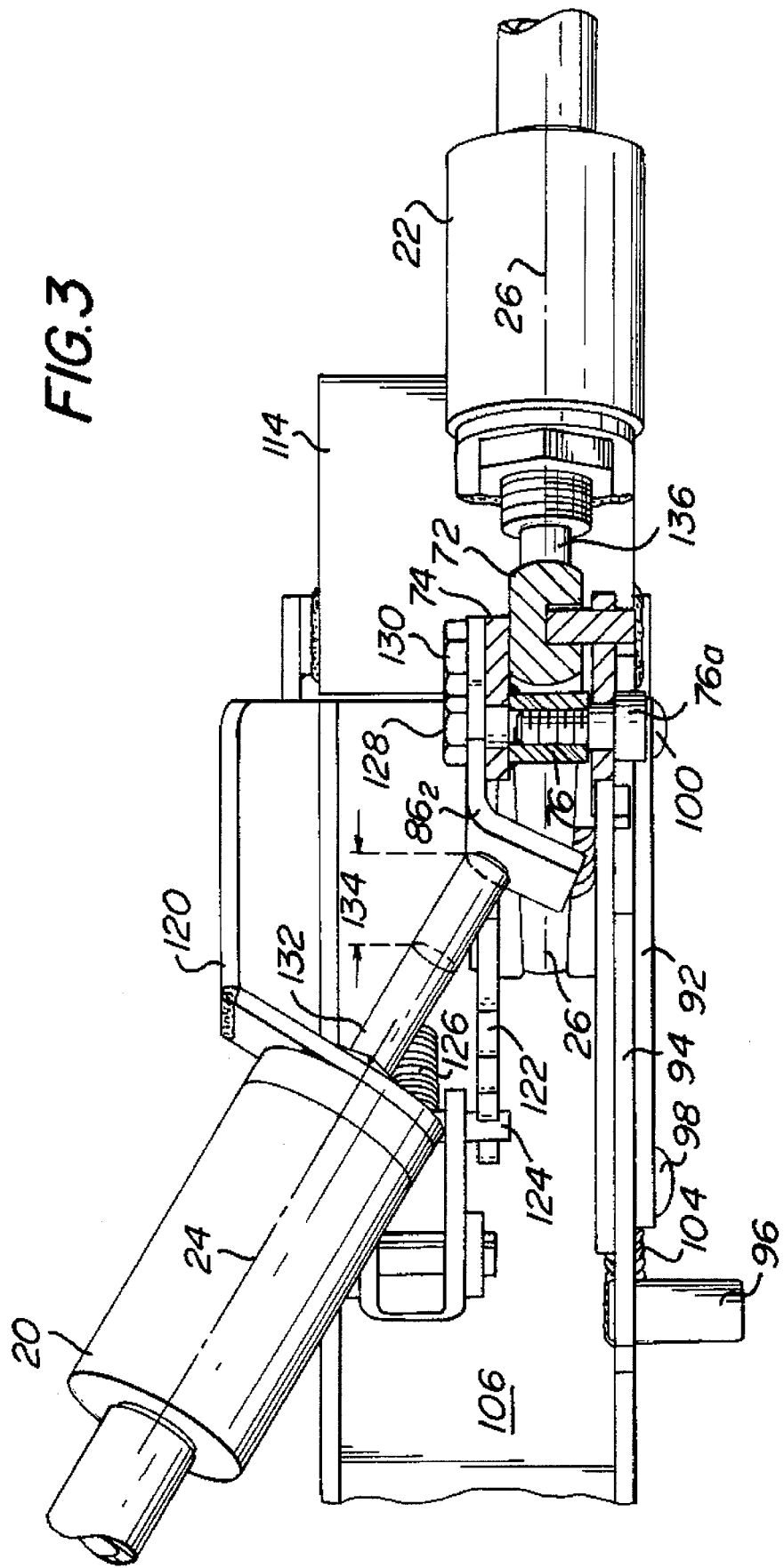
FIG. 3 is a sectional view, taken along line 3—3 of FIG. 2, showing additional details of the gear shift control mechanism of FIG. 2.

Further elements of the gear shift mechanism 18 are illustrated and arranged as shown in FIG. 3, which is a view taken along line 3—3 of FIG. 2, and which additional elements of FIG. 3 are given in Table 4.

TABLE 4

| Reference No. | Element |
| --- | --- |
| 122 | Shift Gate Detented Plate |
| 124 | Detent Positioning Pin |
| 126 | Spring Member Cooperating With Pin 124 |
| 128 | Fastener of Pivot Member 76 |
| 130 | Connecting Member for Projection 86 |

As shown in FIG. 3, the cylinder 20 houses a movable rod 132 that extends outward from the cylinder a pre-determined distance 134 indicated in phantom. As further seen in FIG. 3, the cylinder 20 is positioned, in a pre-determined manner, so that its axis 24 intercepts the projection 86 (shown as $86_2$) mounted to the shift lever arm 72 allowing the movable rod 132 to contact the shift lever arm 72 by impacting the projection 86 during its operation. The cylinder 20, the cylinder mounted forward of the shift lever arm 72 is positioned obliquely to (at an angle offset from) the path of the shift lever arm 72 to permit freedom of movement forward of the location of cylinder 20 to position the gear shift 28 in other than forward gears, e.g. neutral, reverse and park. Similarly, the cylinder 22 is positioned so that its axis 26 intercepts the shift lever arm 72 allowing its movable rod 136 to impact the shift lever arm 72 during its operation, in particular, at least impact the shift lever arm 72 as the shift lever 28 is moved to at least one of its gear shifting positions.

Further, the casing for cylinder 20 has a longitudinal length that exceeds that of the casing of cylinder 22, thereby allowing the movable rod 132 of cylinder 20 to extend out farther than the movable rod 136 extends out of cylinder 22 even though both cylinders may be operated in the same manner. As will be further described, each of the movable rods 132 and 136 is selected to have a short "throw" corresponding to distance 134 of cylinder 20, that is, the rods are moved a relatively short distance upon the activation of the respective cylinder 20 or 22 so that the response time (the time from activation to impacting the projection 86 or the shift lever arm 72) is accomplished in a substantially instantaneous manner, e.g in the millisecond range. The movement of rods 132 and 136 may be further described with reference back to FIG. 2. The pistons or rods 132, 136 of cylinders 20, 22 may be either electrically or pneumatically controlled by control arrangements known in the art which need no additional explanation other than such control arrangements have substantially instantaneous response times as called for by the present invention.

As schematically illustrated in FIG. 2, the shift lever 28 is moved in a direction 30 in response to being directly impacted by both the movable rods 132 and 136 so as to be sequentially moved from the 1st, to the 2nd and to the 3rd gear positions. The shift lever 28 can be moved into "Reverse" or "Park" (respectively shown by the letters R and P depicted on the shift gate plate 102) of gear shift mechanism 18 by first removing power to cylinders 20 and 22, and then grasping reverse lockout lever 74 so that it is moved toward the knob 70 causing the control rod 84 to be pushed downward and allowing the gear positioning pin 88, along with spring member 90, to be sequentially placed into the selected slot (R or P) of the shift gate plate 102. The shift lever 72 is in neutral when positioned against the first lockout detent of plate 102. The movement of the shift lever 28 is pivoted around pin 108 in a curvilinear manner.

As shown in FIG. 2, a plurality of curvilinear arrows 138, 140, 142 and 144, all reference to the center of pivot pin 108, respectively illustrate the curvilinear movement of the spring 90 and extension 88, the projection 86 ($86_1$, $86_2$ and $86_3$ ), the squeezable member 74, and the knob 70 that may be grasped by the driver to move the shift lever 38 when the cylinders 20 and 22 are without power applied thereto. The rotation illustrated by the curvilinear arrows 138, 140, 142 and 144 corresponds to the direction 30 that depicts the movement of the lever arm 28 from its first ($28_1$), to its second ($28_2$) and to its third ($28_3$) gear location.

Curvilinear arrow 140 is of primary interest because it illustrates the movement of the projection 86 through all gears (1st, 2nd and 3rd) positions. The movable rod 136 of cylinder 22 (interrelated with the direction of curvilinear arrow 140) impacts the lower side portions 146 and 148 of the shift lever arm 72, and the movable rod 132 of cylinder 20 (also interrelated with the direction of curvilinear arrow 140) impacts the projection 86 as the shift lever 28 is moved through at least one of its gear positions. More particularly, as shown in FIG. 2 which illustrates the projection 86 in three different positions $86_1$, $86_2$ and $86_3$, the movable rod 132 is segmented into sections A and B whose tip respectively impacts the projections 86₂. The movable rod 136 is segmented into sections A, B and C whose respective tip impacts and contacts side portion 146 of shift lever arm 72 in each position. The movable rods 132 and 136 of cylinders 20 and 22, respectively, are positioned to cooperatively move to prevent overshooting of the shift lever 28 upon each activation of the respective cylinder by the controller 14 (shown in FIG. 2, but to be more fully described with reference to FIG. 4). The ON/OFF states of the cylinders 20 and 22, the extension segment A, B or C of cylinders 20 and 22, the positions ($28_1$, $28_2$ and $28_3$) of shift lever 28, and the related gear speeds 1st (64), 2nd (66) and 3rd (68) shown in FIG. 2, are correlated in Table 5.

TABLE 5

|  | Gear Speeds | | |
| --- | --- | --- | --- |
|  | 1st - (64) | 2nd - (66) | 3rd - (68) |
| Position Of Shift Lever 28 | $28_1$ | $28_2$ | $28_3$ |
| Cylinder 20 |  |  |  |
| • On/Off State | OFF | ON | OFF |
| • Rod 132 Extension Segment (A or B) | A | B | A |
| Cylinder 22 |  |  |  |
| • On/Off State | OFF | ON | ON |
| • Rod 136 Extension Segment (A, B, C) | A | B | C |

As correlated in Table 5, and as illustrated in FIG. 2, when both cylinders 20 and 22 are in their OFF state, extension A of rod 136 contacts side portion 146, and rod 132 does not contact any member of the shift lever 28 and the shift lever 28 is at its home or initial illustrated position $28_1$. When cylinder 22 is transitioned from its OFF to its ON state, the extension rod 136 already in contact with side portion 146 forces, in a ram like manner, the shift lever 28 to move to its position $28_2$ and now contacts side portion 148 and, simultaneously, the activation of cylinder 20 causes its extension rod 132 to move outward from cylinder 20 to its segment B position and, thereby, contact the projection 86₂ which also corresponds to position $28_2$ of shift lever 28. The impact provided by cylinder 22 through its movable rod 136 and the counter-force provided by cylinder 20, having its movable rod 132 meeting projection 86₂, cooperatively combine so that the shift lever 28 does not experience any overshoot, that is, shift lever 28 is directed to and remains at position $28_2$ in response to the combined operation of cylinders 20 and 22. As further shown in Table 5, and as illustrated in FIG. 2, when excitation from controller 14 is continued to be applied to cylinder 22, cylinder 22 seeks and obtains its C segment position while removal of excitation to cylinder 20 causes the movable rod 132 to retract and, thereby, seek and obtain its segment A position. Again, the cooperative action causes the shift lever 28 to be placed into its $28_3$ position.

The foregoing explanation sets forth the relative cooperative movement of the respective movable rods 132, 136 of the cylinders 20, 22 for a forward shift pattern. When a reverse shift pattern is required, the cylinders are positioned such that cylinder 20 is placed in the cylinder 22 position and vice versa. Thus, the control of the extension length of each of the rods will be the same with the effect of moving the shift lever 28 sequentially in the opposite (reverse) direction.

It should now be appreciated that the practice of the present invention provides for cylinders 20 and 22 positioned on opposite sides of the shift lever 28 and cooperatively providing counterforces, but still allowing the shift lever to be moved in a single direction, indicated by arrow 30, as the shift lever 28 moves and sequentially changes the speed gears in transmission 38 from first to second to third gears. The control for such movement is provided by the controller 14 which may be further described with reference to FIG. 4.

Figure 4:
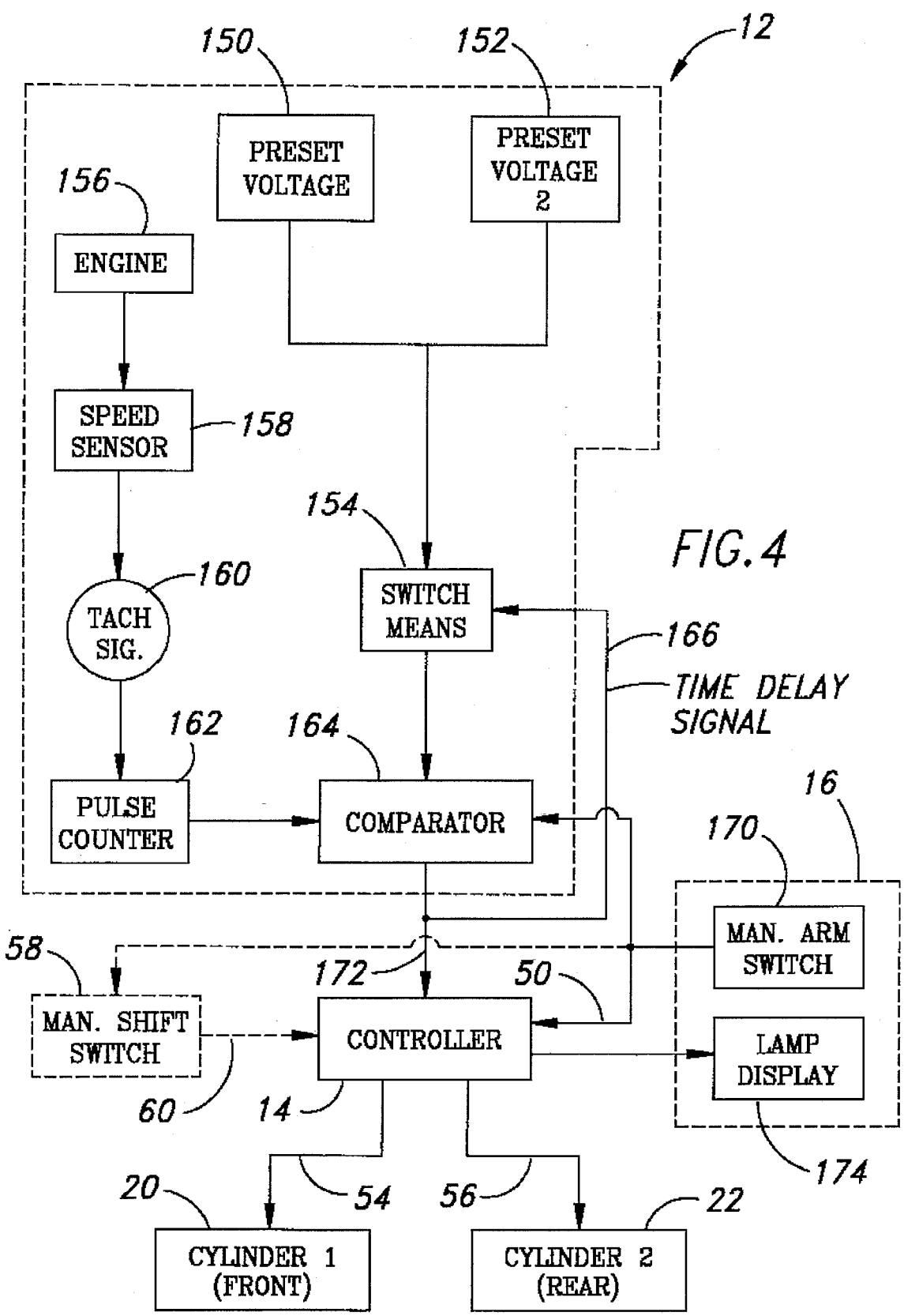
FIG. 4 is a block diagram of the circuit arrangement for automatically controlling the cylinders that are part of the gear shift control mechanism of the present invention.

The controller 14 of FIG. 4 provides a selectable control signal on one or both signal paths 54 and 56 to respectively cause the activation of cylinders 20 and 22, which in one form may be a compressed gas driven device and in another form may be an electrically activated solenoid. For either the compressed gas device or the solenoid, the cylinders 20 and 22 have a movable rod 132, 136, sometimes referred to as a piston. The pistons 132, 136 move axially outward from their respective cylinders 20 or 22 each time the controller 14 supplies a control signal to the respective cylinders 20 and 22 along each of the signal paths 54 and 56. Conversely, if the controller 14 does not supply a control signal, the cylinders 20 and 22, each having a spring member, e.g. spring member 22a of cylinder 22 shown in FIG. 2, retain the piston 132, 136 in a retracted position. Alternatively, the movable rods 132 or 136 may be axially compressed inward by a member, such as projection 86, being moved by the other movable rod of the activated cylinder 20 or 22.

As is known in the art, a controller, such as the controller 14, provides for a relatively high current for a relatively short duration so as to activate and move the piston or rod 132, 136 of the cylinder 20 or 22. The controller 14 of FIG. 4 resets to a known state in response to the signal present on signal path 50 generated by the manual arm switch 170 of the control and display 16. The controller 14 is responsive to the appropriate command signals and in one embodiment is responsive to the speed sensor circuitry 12, while in a second embodiment is responsive to the manual shift switch means 58. In the second embodiment, the controller is responsive to manual activation by the vehicle operator through the use of one or more switches as described below and shown in detail in FIG. 5.

The manual shift switch means 58 may be any appropriate switching device which is reactive to manual depressions of a switch operable by the vehicle operator. The manual shift switch 58 may be located on the vehicle steering wheel or, preferably, on the gear shift lever 28 for ease of manual control by the vehicle operator. With the depression (or other triggering) of the manual shift switch 58 an appropriate signal on signal path 60 is routed to controller 14 so as to cause the controller 14 to energize the cylinders 20 and 22, in the sequence shown in Table 5, at one or more particular times when it is desired to sequentially increase the gear speed from first to second to third. The particular times to shift the gears are manually determined by the vehicle operator and may correspond to prior known conditions or events occurring in a drag racing contest.

Figure 5:
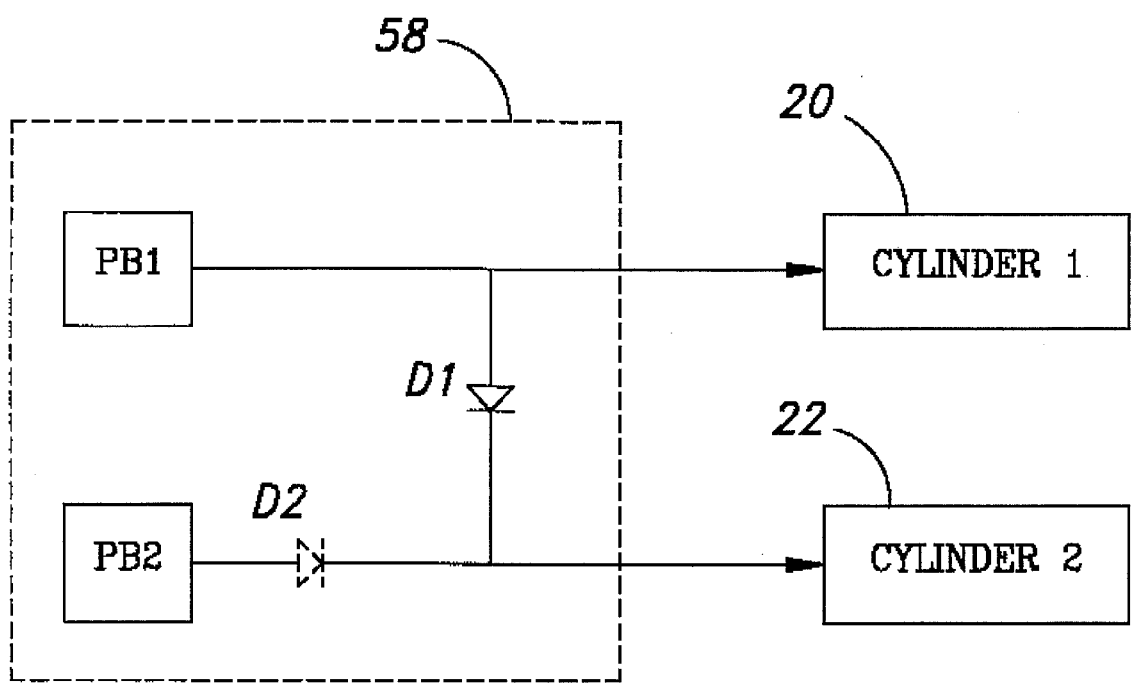
FIG. 5 is a block diagram of the manual activation control of the controller of the present invention.

With reference to FIG. 5, the manual shift switch 58 may be configured as comprising first and second pushbuttons, PB1 and PB2, which upon depression produce control signals on the signal paths to cylinders 1 and 2, cylinder 20, 22 respectively. When depressed, PB1 will produce a first control signal on the signal paths to both cylinder 20 and cylinder 22. This first control signal will cause the shift lever 28 to move from first gear to second gear, with the rod 132 of cylinder 20 blocking further movement of the shift lever. Diode D2 (shown in phantom) may be placed in the circuit adjacent PB2 to avoid improper control signals to cylinder 20 from transient voltages or currents through PB2. Blocking diode D1 keeps a second control signal produced by PB2 from reaching cylinder 20 when PB2 is depressed so that only cylinder 22 is energized in order to move shift lever 28 from the second gear position to the third gear position. The manual shift switch 58 may be positioned on the steering wheel of the vehicle or on the gear shift lever 28, or in any position freely accessible to the vehicle operator. In this manner manual shift switch means 58 causes the manually controlled automatic shifting of the transmission 34 by directly controlling the cylinders 20, 22. An alternate means of control is described below in conjunction with the preferred automatic control shown in FIG. 4.

In the preferred embodiment, the controller 14 is responsive to the speed sensor circuitry 12 which comprises, in combination, the elements set forth in Table 6.

TABLE 6

| Reference No. | Element |
| --- | --- |
| 150 | Preset Voltage 1 |
| 152 | Preset Voltage 2 |
| 154 | Switch Means |
| 156 | Engine |
| 158 | Speed Sensor |
| 160 | Tach. Signal |
| 162 | Pulse Counter |
| 164 | Comparator |

The preset voltages 150 and 152 provide an adjustable voltage that is indicative, when compared to the contents of the pulse counter 162, of a predetermined rotational speed of an element of the drag racing car, or a predetermined speed of the engine of the drag racing car, or the speed of the drag racing car itself. Each of the selectable and predetermined voltage quantities of preset voltages 150 and 154 are routed to switch means 154.

The switch means 154 is preferably an electromagnetic relay of the double-pole, double-throw type whose coil is energized by a time delay signal generated by comparator 164 present on signal path 166. The relay 154 has two inputs, one of which is connected to the preset voltage 150 and the other of which is connected to preset voltage 152. During the absence of the time delay signal present on signal path 166, the relay 154 routes the preset voltage 150 to the comparator 164 by way of its normally open contacts and, conversely, during the presence of the time delay signal on signal path 166, the switch 154 routes the preset voltage 152 via its normally open contacts to the comparator 164.

The comparator 164, in response to the signal generated by the manual arm switch 170, resets its logic to a known state. The comparator 164 may be of any conventional type, such as an operational amplifier, that compares two quantities one of which is either the preset voltage 150 or the preset voltage 152 and the other of which is the output of the pulse counter 162. When the signal developed by pulse counter 162 equals or exceeds the preset voltage 150 or 152 routed by switch means 154, the comparator 164 generates appropriate command signals on signal path 172 that are routed to controller 14.

Pulse counter 164 is the device that indicates the number of pulses presented to it in a given interval, or the total number of pulses presented to it without regard to time. More particularly, pulse counter 162 counts repetitively occurring signals and provides a voltage level output signal corresponding to the accumulated repetitively occurring signals. In the preferred embodiment, the pulse counter 162 receives its pulses from the TACH signal 160 originating in the vehicle ignition system which may be derived from a tachometer signal, a dwell angle voltage, a spark control voltage, or any other means available which can provide an RPM value of the engine speed for providing a signal indicative of the acceleration being experienced by the drag racing car. The pulse counter 162 accumulates the pulses supplied to it from the TACH signal 160 and provides a signal, having a corresponding voltage level, to one input of the comparator 164 which has its other input connected through the switch means 154 to preset voltage 150 or 152. The corresponding voltage level of pulse counter 162 may be selected to represent a predetermined acceleration condition of the drag racing car, e.g. the engine 156 has obtained a desired RPM whereby shifting may be accomplished in an optimum manner. Because of the electronic configuration of the present invention, other conditions may be preselected to allow for optimum shifting of the drag racing car.

In operation, after the receipt of the signal generated by the manual arm switch 170 of the control and display 16, the comparator 164 compares the output of pulse counter 162 against the preset voltage 150, and if the voltage of the pulse counter 162 is less than that of preset voltage 150, the comparator 164 provides the appropriate signal on signal path 172 to controller 14 so that both of the cylinders 20 and 22 are held in their OFF condition (see Table 5) leaving shift lever 28 at its first gear position $28_1$. The comparator 164 continues this comparison between pulse counter 162 and preset voltage 150 and when the output of the pulse counter 162 exceeds that of the preset voltage 150, comparator 164 generates a signal on signal path 172 which is recognized by the controller 14 and which, in turn, generates the signals on signal paths 54 and 56 so that the cylinders 20 and 22 both interact to move the shift lever 28 to its second speed position $28_2$ (see Table 5).

After a predetermined duration, such as one/half to one second, the comparator 164 generates a signal on signal path 166 which causes the relay 154 to route the preset voltage 152 from the second input of relay 154 to the output of relay 154 so as to be applied to comparator 164. The time delay provided for the signal controlling switch means 154 in signal path 166 is desired in order to allow the controller 14 and the cylinders 20 and 22 sufficient time to cause the shift lever 28 to be moved from its first position ($28_1$) to its second position ($28_2$).

Upon the application of the preset voltage 152 to comparator 164, the comparator 164 compares the output of the pulse counter 162 against the preset voltage 152, and when the voltage of the pulse counter 162 exceeds that of the preset voltage 152, the comparator 164 generates appropriate signals to controller 14 which, in turn, generates the ON/OFF signals (see Table 5) to the cylinders 20 and 22 so that the shift lever 28 moves from its second ($28_2$) to its third position ($28_3$).

It should now be appreciated that the practice of the present invention provides for speed control circuitry and an elapsed time control circuitry that cause the controller of the present invention to respond to predetermined conditions, such as predetermined RPM levels of an engine, predetermined rotational speed of the engine, or any other rotational device indicative of the acceleration parameter of the drag racing car so as to cause the transmission to sequence its gears from its first, to its second, to its third positions, all occurring at optimum times.

Alternatively, manual control of the automatic shifting function of the present invention is accomplished by depression of one or more pushbuttons like those described in connection with FIG. 5. The output of the pushbuttons (which are part of the manual shift switch 58) can be applied to the controller 14 such that the first of such signals causes the activation of both signal lines 54, 56 and the second of such signals causes the activation of only signal line 56. In this manner cylinders 20, 22 are properly sequentially controlled to cause the shifting of the gears from first to second and then to third in accord with the vehicle operator's depression of the pushbutton(s).

The controller 14 can also provide the appropriate signals on signal path 52 that are routed to the lamp display 174 of the control and display 16. The lamp display 174 may indicate selected parameters such as the gear (first, second or third) in which the drag racing car is then presently engaged, or it may be used to display red, yellow and green indications that are respectively indicative of danger, possible danger, and no danger conditions of the engine of the drag racing car. Further, the lamp display 174 may be a device that indicates, in a ramp like manner, the RPM level of the engine and provides limits such as 0 and maximum RPM for such a lamp display. Because the elements (such as 12, 14, 58) are primarily electronics, the lamp display 174 may be interconnected to the arrangement of FIG. 4 to monitor any function deemed critical in the acceleration performance of the drag racing car and to do so without unnecessarily distracting the driver's attention.

It should now be appreciated that the practice of the present invention provides for not only control of the shift lever of the gear shift mechanism of a drag racing car in response to a series of predetermined and optimum conditions, but also allows such predetermined and optimum conditions to be displayed for the driver of the drag racing car, and allows manual input control to the automatic gear shifting system. The present invention may also be utilized to control gear shifting in other types of vehicles such as go-carts, mud-pacers, sand drags, boat racers and monster trucks.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A racing car comprising:
    a transmission having at least first, second and third speed changing gears and means for shifting said speed changing gears;
    a control mechanism comprising:
        a shift lever having upper and lower portions each having opposite sides and with a projection extending outward from said lower portion, said shift lever having means for being interconnected to and controlling said means for shifting said gears of said transmission; and
        first and second cylinders respectively responsive to first and second control signals, said first and second cylinders being disposed on said opposite sides of said lower portion of said shift lever and each having a movable shaft that axially extends outward from its respective cylinder, said first and second cylinders being further disposed in a pre-determined orientation so that said first and second cylinders supply counter-forces by means of their axially extending shafts to cause movement of said shift lever in a manner to sequence from at least one speed to another speed.

2. The racing car according to claim 1, wherein said first and second control signals are generated by a controller responsive to command signals generated by means for detecting the speed of the engine of said racing car.

3. The racing car according to claim 1, wherein said first and second control signals are generated by a controller responsive to command signals generated by means for detecting the rotational speed of the wheel of said racing car.

4. The racing car according to claim 2, wherein said means for detecting the rotational speed of said racing car comprises:
    means for sensing the rotational speed of the engine and providing a repetitively occurring signal having a corresponding voltage level;
    a first preset voltage corresponding to a first signal indicative of a first speed of said racing car;
    a second preset voltage corresponding to a second signal indicative of a second speed of said racing car;
    switching means having an input and an output, said input connected to said first and second speed indicating signals, said switching means responsive to the presence and absence of a switching means control signal for selectably connecting one of said first and second speed indicating signals to said output so as to provide an output signal of said switching means; and
    comparator means with an input stage having as a first input said repetitively occurring signal and having a second input connected to said output signal of said switching means, said comparator first comparing its first input against the first speed indicating signal present at its second input and generating said switching means control signal and a first command signal to said controller when said first input exceeds said second input, said comparator next comparing its first input against the second speed indicating signal present at its second input and generating a second command signal to said controller when said first input exceeds said second input.

5. A racing car according to claim 3, wherein said means for detecting the rotational speed of said rotating wheel comprises:
    means for sensing the rotational speed of said rotating wheel and providing a repetitively occurring signal having a corresponding voltage level;
    a first preset voltage corresponding to a first signal indicative of a first speed of said racing car; .
    a second preset voltage corresponding to a second signal indicative of a second speed of said racing car;
    switching means having an input and an output, said input connected to said first and second speed indicating signals, said switching means being responsive to the presence and absence of a switching means control signal for selectively connecting one of said first and second speed signals to its output source to provide an output signal of said switching means; and
    comparator means with an input stage having first and second inputs with the first input being said repetitively occurring signal and the second input connected to said output signal of said switching means, said comparator first comparing its first input against the first speed indicating signal present at its second input and generating said switching means control signal and a first command signal to said controller when said first input exceeds said second input, said comparator next comparing its first input against the second speed indicating signal present at its second input and generating a second command signal to said controller when said first input exceeds said second input.

6. The racing car according to claim 1, wherein said first and second control signals are generated by a controller responsive to command signals generated by means for detecting elapsed time.

7. The racing car according to claim 1, further comprising an array of lamps indicative of the rotational speed of said racing car and the gear in which said racing car is engaged.

8. The racing car according to claim 1, wherein said first and second cylinders are coaxially disposed on opposite sides of said lower portions of said gear shift lever.

9. The racing car according to claim 1, wherein said first and second cylinders are disposed in an offset orientation relative to each other and on opposite sides of said lower portions of said gear shift lever.

* * * * *